Feb. 26, 1929.
A. ZELNIO ET AL
1,703,701
VALVE LOCK
Filed Feb. 13, 1928
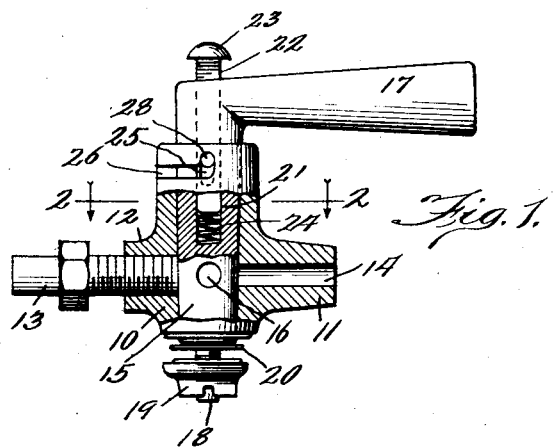
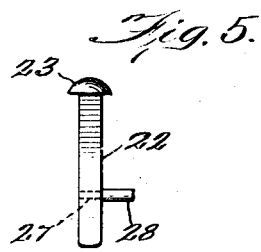
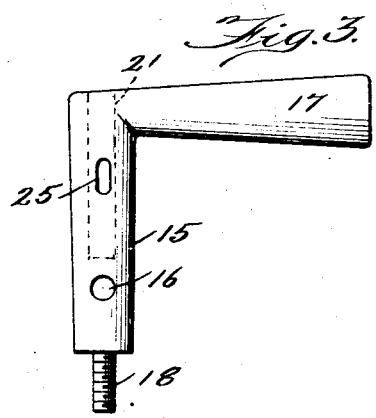
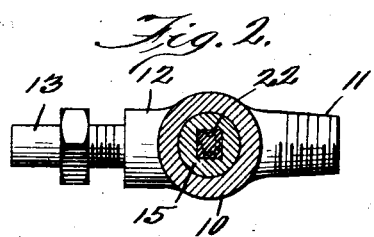
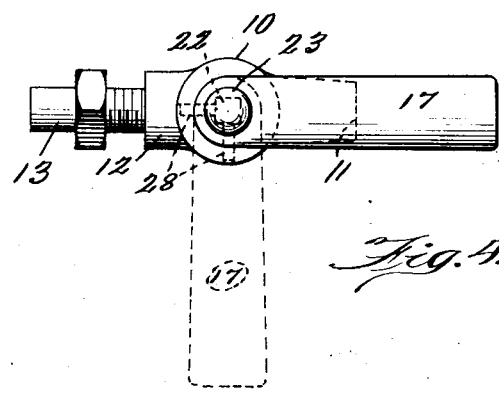
Inventors:
Z. Zelnio
A. Zelnio
S. Zelnio
By B. Pelechowicz
Atty.

Patented Feb. 26, 1929.

1,703,701

UNITED STATES PATENT OFFICE.

ADOLF ZELNIO, SZYMON ZELNIO, AND ZYGMUNT ZELNIO, OF MOLINE, ILLINOIS.

VALVE LOCK.

Application filed February 13, 1928. Serial No. 254,137.

The present invention relates to valve locks, and has particular application in valves in gas ranges and stoves, the principal object thereof being the provision of a device in association with the valve plug to hold the same locked when in closed position to prevent inadvertent opening of the same.

With the above general object in view and others that will appear as the nature of the invention is better understood, the same consists in the novel construction, combination and arrangement of parts hereinafter more fully described, illustrated in the accompanying drawing and pointed out in the appended claim.

In the drawing forming part of this application, and in which like designating characters refer to corresponding parts throughout the several views, Fig. 1 is a side view, partly in section and partly in elevation, showing the operation of the device when the valve is closed;

Fig. 2 is a cross-sectional view on a horizontal plane, on line 2—2 of Fig. 1;

Fig. 3 is a side elevational view of the valve plug and the handle;

Fig. 4 is a top plan view of the valve; and

Fig. 5 is a side elevational view of locking means operable with the valve plug.

Referring to the drawing in detail there is shown therein valve casing 10 having a horizontal cylindrical projection 11 which is adapted for attachment to a manifold. At the diametrically opposite side of said valve casing 10 there is a similar projection 12 provided with a threaded bore for receiving pipe 13 which supplies the gas to a burner in a range or gas stove. Said projection 11 is likewise provided with bore 14 through which gas is supplied to pipe 13.

Valve plug 15 is fitted within valve casing 10 and remains in the path of bore 14. Said plug is provided at its lower end with bore 16 which is adapted to register with bores 11 and 14 for supplying the gas. Plug 15 is operable by means of handle 17 which is integrally formed with the plug. At its lower end said plug 15 is provided with a reduced threaded lug 18 which is adapted to receive nut 19. Interposed between the lower end of valve casing 10 and said nut 19 is a compressed coil spring 20 by means of which plug 15 is held in position within said casing 10.

Valve plug 15 is further provided with a square bore 21 which is centrally and axially located in said valve plug and which terminates above the transverse bore 16. Said bore 21 is adapted to receive a square lug 22 within which bore said lug 22 is adapted for upright sliding movement, said lug 22 being slightly shorter than the length of bore 21. At its upper end said lug 22 is provided with an integrally formed head 23.

Positioned within said bore 21 and contacting with the lower end of said lug 22 is coil spring 24 which at all times tends to press said lug 22 upwardly. In alinement with the transverse bore 16 the valve plug 15 is further provided with an oblong slot 25 which is located substantially at a central point between said transverse bore 16 and the upper end of valve plug 15, for the purpose hereinafter described.

Adjacent the upper end of valve casing 10 bayonet slot 26 is made in said casing, with its longer portion horizontally disposed and its shorter portion vertically positioned.

In assembling various parts in their cooperating arrangement, upon mounting the valve plug within casing 10 and holding the same in position by nut 19 and spring 20, lug 22 is inserted within bore 21 of the valve plug 15. Thereupon manual pressure is applied to head 23 until bore 27 made in lug 22 is in alinement with the horizontal portion of bayonet slot 26. Thereupon pin 28 by its reduced end is driven into bore 27. Thus said pin 28 will at all times remain within the bayonet slot 26 and will cooperate therewith for either facilitating or preventing the rotation of the valve plug 15 when under actuation by handle 17.

Fig. 1 illustrates the position of the various parts when valve is closed with pin 28 remaining at the upper end of the shorter vertical portion of the bayonet slot 26, with bore 14 blocked by the solid portion of the valve plug 15. In this position of the valve plug handle 17 will remain in substantially parallel relation with projection 11 and pipe 13, and will be held against rotation due to the engagement of pin 28 with casing 10 by virtue of its being in the said shorter vertical portion of bayonet slot 26. To open the valve for the purpose of bringing bore 16 in alinement with bore 14 and pipe 13, for the purpose of permitting an unimpeded flow of gas therethrough, manual pressure is applied to head 23 for bringing pin 28 out of engagement with the valve casing and into the horizontal portion of bayonet slot 26. It is observed that the oblong slot 25 registering with the shorter vertical portion of bayonet slot 26 permits free movement of pin 28 within said oblong slot 25 as well as with the shorter vertical portion of bayonet slot 26. By pressing at head 23 pin 28 will be brought in path of the horizontal portion of the bayonet slot 26 and then handle 17 may be angularly moved for rotating valve plug 15 for opening the valve or for bringing bore 16 in alinement with bore 14 and pipe 13 for permitting the flow of gas.

It is observed that the horizontal portion of bayonet slot 26 is long enough to permit at least one-fourth of revolution of valve plug 15, as is indicated on Fig. 4 by two positions of handle 17, the position of handle 17 when the valve is closed being indicated by full lines, and the position when valve is opened being shown by dotted lines.

As long as pin 28 remains within the horizontal portion of bayonet slot 26 valve plug 15 may be freely rotated as far as the ends of the horizontal portion of bayonet slot 26 will permit, and as long as pin 28 remains within the horizontal portion of bayonet slot 26 no pressure at lug 22 to rotate plug 15 is required. When closing the valve handle 17 is rotated together with valve plug 15 until pin 28 is brought in alinement with the shorter vertical portion of bayonet slot 26, when due to pressure of spring 24 exerted at the lower end of lug 22, said pin 28 will automatically spring into said shorter vertical portion of bayonet slot 26 which will be held therewithin for preventing rotation of the valve plug 15.

While there is described herein a preferred embodiment of the present invention, it is nevertheless to be understood that minor changes may be made therein without departing from the spirit and scope of the invention as claimed.

What we claim as new is:

In a device of the type described a valve casing and a valve plug therewithin formed with a bore having polygonal cross-sectional shape, a polygonal lug positioned within the bore to be axially and centrally of the plug, a pin upon said lug, said valve plug having an oblong slot communicating with the bore through which said pin extends, said valve casing being provided with a bayonet slot including a vertical portion, said pin extending to and operating within said bayonet slot, and tensioning means in said bore for driving said lug upwardly to expose a portion of the same without the plug and for bringing about an automatic engagement of said pin with said vertical portion of said bayonet slot when the valve remains closed for the purpose of maintaining the valve plug against rotation.

In testimony whereof we affix our signatures.

ADOLF ZELNIO.
SZYMON ZELNIO.
ZYGMUNT ZELNIO.